United States Patent [19]

Lumsden et al.

[11] Patent Number: 4,525,001
[45] Date of Patent: Jun. 25, 1985

[54] PIPE CONNECTOR WITH INTERENGAGABLE TUBULAR PIN AND TUBULAR BOX MEMBERS

[75] Inventors: Norman Lumsden; Brian K. Phillips, both of Aberdeen, Scotland

[73] Assignee: Hunting Oilfield Services (UK) Limited, Aberdeen, Scotland

[21] Appl. No.: 458,154

[22] Filed: Jan. 14, 1983

[30] Foreign Application Priority Data

Jan. 18, 1982 [GB] United Kingdom ............... 8201250

[51] Int. Cl.³ ............................................. F16L 25/00
[52] U.S. Cl. .................................. 285/328; 285/331; 285/332.4; 285/381; 285/382; 285/DIG. 22
[58] Field of Search ............... 285/381, 333, 334, 328, 285/331, 332.4, 382, DIG. 22

[56] References Cited

U.S. PATENT DOCUMENTS

| 418,752 | 1/1890 | Rogers | 285/381 |
| 3,114,566 | 12/1963 | Coberly et al. | 285/381 X |
| 3,667,784 | 6/1972 | Hokanson et al. | 285/334 X |

FOREIGN PATENT DOCUMENTS

| 2033518 | 5/1980 | United Kingdom. |  |
| 1573945 | 8/1980 | United Kingdom. |  |
| 2113335 | 8/1983 | United Kingdom | 285/381 |

Primary Examiner—Dave W. Arola
Attorney, Agent, or Firm—Watson, Cole, Grindle & Watson

[57] ABSTRACT

The pipe connector comprises a pin member and a box member which have outer and inner generally frusto-conical peripheral surfaces which overlie one another when the members are fully engaged together. To axially lock the members together, the surfaces are provided with interengaging annular projections and grooves. For disengagement of the members, pressurized fluid is supplied between the peripheral surfaces through an inlet in the box member. The ends of the peripheral surfaces are sealed, during disengagement, by providing reversely inclined annular surfaces on the free ends of the pin and box members and correspondingly at the roots of the box and pin members. In use of the connector these inclined surfaces are slightly spaced apart and are brought into sealing contact on application of pressurized fluid between the peripheral surfaces.

6 Claims, 4 Drawing Figures

1

PIPE CONNECTOR WITH INTERENGAGABLE TUBULAR PIN AND TUBULAR BOX MEMBERS

BACKGROUND OF THE INVENTION

1. Field of the Invention

The present invention relates to pipe connectors, particularly, but not exclusively, for use in connecting pipe sections of a pipe string for use in drilling. More particularly the invention relates to an improvement in the pipe connectors described in British Pat. No. 1573945 and in U.K. Patent Application Publication Nos. 2033518A and 2113335A.

2. The Prior Art

In British Pat. No. 1573945 there is described a pipe connector comprising a tubular pin member having a frusto-conical outer peripheral surface and a tubular box member having a frusto-conical inner peripheral surface corresponding to the frusto-conical outer peripheral surface of the pin member and which overlies that surface when the members are engaged together. In use, the two members are telescoped together and are axially locked together by interengageable annular projections and grooves provided on the noted peripheral surfaces, the projections and grooves being spaced apart along and extending the full length of the two surfaces.

In telescoping the two members together, the members are initially telescoped until surface contact is made between at least portions at the ends of the overlapped portions of the members to provide seals. Then fluid under pressure is preferably supplied between the members to expand the box member and/or contact the pin member, while at the same time an axial force is applied to the members to bring them together and interengage the projections and grooves. To disengage the members, fluid under pressure is again supplied between the members to expand the box member and/or contract the pin member to progressively bring the projections out of the grooves and so permit the members to be moved axially apart. However, for the pressurized fluid to be effective, seals must be maintained at both ends of the overlapped frusto-conical surfaces. Additionally, it has been found that if there is any tendency in either of the two members to deviate from a circular cross section during this expansion/contraction, the resulting ovality of the members will effectively break the seal so that the pressure of the fluid is dissipated and the members cannot then be disengaged.

SUMMARY OF THE INVENTION

According to the present invention, there is provided a pipe connector comprising a tubular pin member having a generally frusto-conical outer peripheral surface, a tubular box member having a generally frusto-conical inner peripheral surface corresponding to the outer peripheral surface of the pin member and which overlies the outer peripheral surface of the pin member when the members are fully engaged together, the peripheral surfaces being provided with annular projections and grooves which interengage when the members are fully engaged together to axially lock the members together, and means for supplying fluid under pressure between the peripheral surfaces when the members are fully engaged together for use in disengaging the members, wherein the free end surface of at least one of the pin member and the box member includes an annular portion inclined in the opposite direction to the direction of inclination of the peripheral surface thereof, and at least one of the box member and the pin member is provided with a correspondingly inclined annular surface which, when the members are fully engaged together, overlies and is closely spaced from the corresponding surface on the pin or box member, these surfaces being brought into sealing contact when pressurized fluid is applied between the peripheral surfaces of the members for use in disengaging the members.

These inclined surface portions of the members thus provide the seals at the ends of the frusto-conical surfaces during disengagement of the members to permit disengagement while permitting expansion and/or contraction of the members sufficient to enable the projections to be disengaged from the grooves. Additionally, they limit any tendency of either of the members to deviate from a circular cross-section.

Advantageously, the projections and grooves on the members do not extend to the free ends of the members but are slightly set back so as not at least to overlap the axial extents of the inclined surfaces. The resulting end surfaces of the members may be frusto-conical with the same conicity as the frusto-conical surfaces which are provided with the projections and grooves, or may be cylindrical.

The present invention will be more fully understood from the following description of an embodiment thereof, given by way of example only, with reference to the accompanying drawings:

DETAILED DESCRIPTION OF THE PREFERRED EMBODIMENTS

Figure 1:
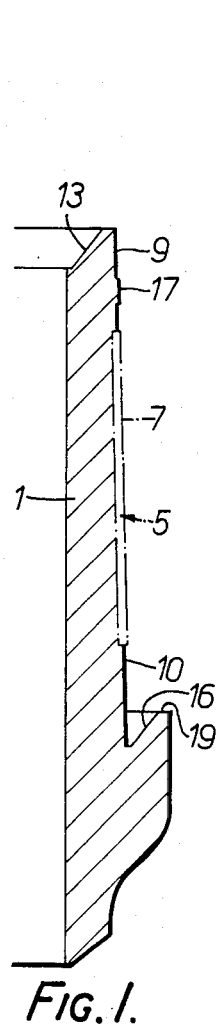
FIGS. 1 and 2 are part axial sections through the pin member, and box member respectively, of an embodiment of a pipe connector according to the present invention.

As shown in the drawings, the pipe connector comprises a tubular pin member 1 for connection to the end of a pipe (not shown), and a tubular box member 3 for connection to the end of a pipe (not shown) which is to be connected to the pipe that is connected to the pin member. The pin and box members are telescopically engageable and having generally corresponding generally frusto-conical outer and inner peripheral surfaces 5, 6, respectively, which overlie one another when the pin member 1 is fully engaged with the box member 3.

To axially lock the pin member relative to the box member when the members are engaged, the box member has in its frusto-conical surface 6 a plurality of axially spaced circumferentially extending annular grooves (or projections), each of which extends in a radial plane. The pin member has corresponding axially spaced circumferentially extending annular projections (or grooves) corresponding to the grooves (or projections) on the box member. The grooves and projections have not been shown in detail in the drawings but have been shown diagrammatically by the broken line regions 7, 8 of the surfaces 5, 6. The projections and grooves are as described in the British Pat. No. 1573945, U.K. Patent Application Publication No. 2033518A and U.K. Patent Application Publication No. 2113335A and reference should be made to the Specifications for a full description of the projections and grooves.

As shown, the projections and grooves 7, 8 do not extend the full length of the peripheral surfaces of the members 1, 3 which include annular end surface portions 9, 10 and 11, 12. As shown, these surface portions 9, 10, 11 and 12 are frusto-conical with the same conicity as the surfaces 5, 6 and extend on surfaces intermediate the surfaces defined by the crest and root surfaces of the projections and grooves. In a modification, surfaces 9 and 12 may extend level with the crests of the projections and surfaces between the grooves, and surfaces 10, 11 may extend level with the surfaces between the projections and roots of the grooves. In another modification, the surfaces 9, 10, 11 and 12 may be cylindrical with diameters corresponding to those of the adjacent end ones of the projections and grooves to lie level with or intermediate the crests and roots as described above, or the surfaces 10, 11 may be cylindrical and surfaces 9 and 12 frusto-conical or vice versa.

As described in any of the foregoing citations, to facilitate engagement and permit disengagement of the members, hydraulic fluid is supplied to the overlapped portions of the members via a radical duct 2 in the box member and an axial groove in the box member or in both the box and pin members.

To disengage the members, the fluid has first to cause expansion of the box member and/or contraction of the pin member sufficient to disengage the projections and grooves and so permit axial relative movement of the members. During this initial stage of disengagement, there is a tendency for the fluid to flow out from the ends of the frusto-conical surfaces as soon as contraction and/or expansion occurs but before the projections and grooves are disengaged. If the out or leakage flow is sufficiently high, the pressure in the fluid will be reduced to such an extent that it is no longer possible to disengage the members. Additionally, any tendency of either of the members towards ovality during expansion and/or contraction will make it impossible to disengage the members.

Figure 3:
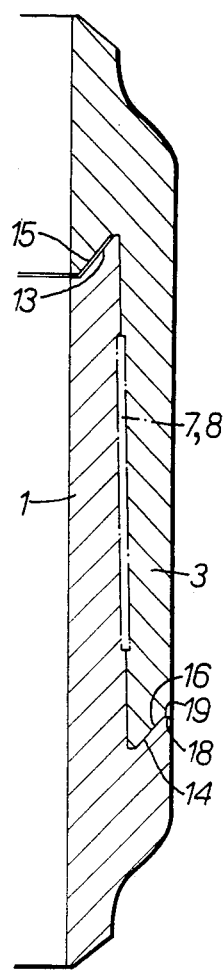
FIG. 3 is a corresponding part axial section showing the members of FIGS. 1 and 2 engaged.

To prevent both the above problems occurring, the free end of the pin member 1 and the free end of the box member 2 are provided with surfaces 13, 14, respectively, which have an inclination opposite to that of the corresponding frusto-conical surface. Additionally, the box and pin is provided with a corresponding surface, 15, 16, respectively, which, when the members are fully engaged as shown in FIG. 3, overlies the respective surface 13, 14. In use, the surfaces 13, 15 and 14, 16 are slightly spaced from each other so that their existence does not interfere with the correct interengagement of the projections and grooves. However, when the two members 1, 3 are to be disengaged and pressurized fluid is applied between the surfaces 5, 6, expansion of the box and/or contraction of the pin forces the surfaces 13, 15 and 14, 16 into contact to seal the ends of the overlapped surfaces and prevent any escape of the pressurized fluid. When the box has expanded and/or the pin contracted to such an extent that the projections and grooves are dis-engaged, the two members can be moved axially apart. This will eventually break the seal provided by the surfaces 13, 15 and 14, 16, but this movement brings the crests of at least some of the projections onto the surfaces between the grooves to re-establish a sufficient seal.

To prevent escape of fluid carried by pipes connected by the above-described connector, in use, an annular projection 17 may be provided in surface 9 as shown or in surface 11 which has a radial interference fit against surface 11 or surface 9 respectively. A similar projection may be provided in surface 10 or surface 12 which has a radial interference fit with surface 12 or 10 respectively. The projections may be as shown or may be part circular in radial section or they may extend for substantially the full extent of the respective surface.

Figure 2:
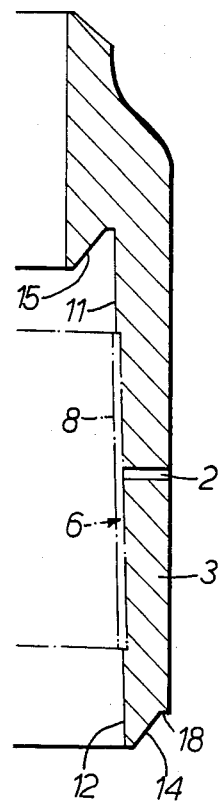

As shown in FIGS. 1 to 3, surfaces 13 and 15 and 14 and 16 are generally frusto-conical with the same angles of conicity. This provides sealing for disengagement over an area of the surfaces but does require that the surfaces be manufactured to very close tolerances. In a modification, as shown in FIG. 4, surfaces 13 and 14 may be radiussed to provide a linear seal which is easier to achieve.

Figure 4:
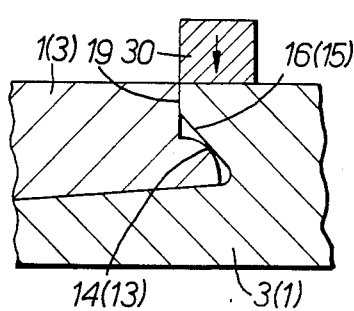
FIG. 4 is a part axial section showing a modification for the members of FIGS. 1 and 2.

To improve the seal provided between the surfaces 13–16 during disengagement of the members, a clamp may be used which encircles the pin member in the region of surfaces 16, 19, as shown at 30 in FIG. 4, and which applies a radially directed force to the surface 16.

In a further modification, the surfaces 16 and 19 on the pin member and the corresponding surfaces on the box member may be provided by a separate annular element which is fixed, e.g., by making it a force fit, in an appropriately shaped recess in the respective pin or box member.

Where the pipes connected by the above described connector are to be used for pile driving, abutment surfaces may be provided at one or other end of the connector which are arranged, as described in the above citation, to produce a friction fit between the abutment surfaces and corresponding surfaces of the projections and grooves. As shown, the free end of the box member 3 is provided with a radial surface portion 18 and a corresponding radial surface portion 19 is provided on the pin member 1, these surfaces 18, 19 being brought into abutment when the members are fully engaged.

In an embodiment, the surfaces 13, 15 and 14, 16 are frusto-conical and extend at 45° to the radial plane and the radial clearance between them is of the order of 0.05 cms (0.02 inch), the radial overlap between the projections and grooves being of the order of 0.075 cms (0.03 inch). The conicity of the frusto-conical surfaces 5, 6 is 1.5° or 2°. The members are made of high tensile steel for welding to steel pipes.

Although in the preferred embodiment the surfaces 13, 15, 14 and 16 are inclined at 45° to the radial plane, it will be appreciated that this angle can vary considerably and the surfaces function as required.

As described above, the members are intended to be welded to the pipes. It will be appreciated that they may be connected to the pipes by other means or may be made integral therewith.

What is claimed is:

1. In a pipe connector comprising a tubular pin member having a generally frusto-conical outer peripheral surface, a tubular box member having a generally frusto-conical inner peripheral surface corresponding to said outer peripheral surface of said pin member and which overlies said outer peripheral surface of said pin member when said members are fully engaged together, said peripheral surfaces being provided with annular projections and grooves which interengage when said members are fully engaged together to axially lock said members together, and means for supplying fluid under pressure between said peripheral surfaces when said members are fully engaged together for use in disengaging said members, the improvement wherein at least one of said pin member and said box member has a free end surface which includes an annular portion inclined in the opposite direction to the direction of inclination of said peripheral surface thereof, and the other one of said box member and said pin member is provided with a correspondingly inclined annular surface which, when said members are fully engaged together, overlies and is closely spaced from said corresponding surface on said pin member of box member, said surfaces, when said members are fully engaged together, being intentionally brought into sealing contact only when pressurized fluid is applied between said peripheral surfaces of said members for use in disengaging said members.

2. A pipe connector as claimed in claim 1, wherein the end surface portions of the peripheral surfaces of the pin and box members at least in the regions of the inclined surfaces are free of projections and grooves.

3. In a pipe connector comprising a tubular pin member having a generally frusto-conical outer peripheral surface, a tubular box member having a generally frusto-conical inner peripheral surface corresponding to said outer peripheral surface of said pin member and which overlies said outer peripheral surface of said pin member when said members are fully engaged together, said peripheral surfaces being provided with annular projections and grooves which interengage when said members are fully engaged together to axially lock said members together, and means for supplying fluid under pressure between said peripheral surfaces when the members are fully engaged together for use in disengaging said members, the improvement wherein said pin member and said box member each has a free end surface which includes an annular portion inclined in the opposite direction to the direction of inclination of said peripheral surface thereof, and said box member and said pin member respectively is provided with a correspondingly inclined annular surface which, when said members are fully engaged together, overlies and is closely spaced from said corresponding surface on said pin member or box member, and surfaces, when said members are fully engaged together, being intentionally brought into sealing contact only when pressurised fluid is applied between the peripheral surfaces of the members for use in disengaging said members.

4. A pipe connector as claimed in claim 3, wherein the end surface portions of the peripheral surfaces of the pin and box members at least in the regions of the inclined surfaces are free of projections and grooves.

5. A pipe connector as claimed in claim 3, wherein said free end surface of said box member includes a portion which extends generally radially and said pin member is provided with a corresponding generally radial surface, which surfaces are brought into abutment when said members are fully engaged together for the transmission of axially directed forces therebetween.

6. A pipe connector as claimed in claim 5, wherein said generally radially extending portion of said free end surface of said box member is positioned radially outwardly of said inclined surface portion.

* * * * *